United States Patent
Kim

(10) Patent No.: US 9,147,903 B2
(45) Date of Patent: Sep. 29, 2015

(54) SEPARATOR FOR REDOX FLOW BATTERY AND REDOX FLOW BATTERY

(75) Inventor: Hee-Tak Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 880 days.

(21) Appl. No.: 13/290,916

(22) Filed: Nov. 7, 2011

(65) Prior Publication Data

US 2012/0263990 A1  Oct. 18, 2012

(30) Foreign Application Priority Data

Apr. 18, 2011 (KR) .................. 10-2011-0035830

(51) Int. Cl.
| | |
|---|---|
| H01M 2/14 | (2006.01) |
| H01M 2/16 | (2006.01) |
| H01M 2/18 | (2006.01) |
| H01M 8/18 | (2006.01) |
| H01M 8/10 | (2006.01) |
| B82Y 30/00 | (2011.01) |

(52) U.S. Cl.
CPC .............. *H01M 8/188* (2013.01); *B82Y 30/00* (2013.01); *H01M 8/1023* (2013.01); *H01M 8/1053* (2013.01); *H01M 8/1067* (2013.01); *H01M 2008/1095* (2013.01); *H01M 2300/0082* (2013.01); *H01M 2300/0094* (2013.01); *Y02E 60/521* (2013.01); *Y02E 60/528* (2013.01)

(58) Field of Classification Search
USPC ........ 429/50–52, 96–100, 129–147, 247–255
See application file for complete search history.

(56) References Cited

U.S. PATENT DOCUMENTS

| | | | |
|---|---|---|---|
| 4,786,567 A | * | 11/1988 | Skyllas-Kazacos et al. .... 429/51 |
| 2001/0028977 A1 | * | 10/2001 | Kazacos et al. ............... 429/105 |
| 2005/0074653 A1 | | 4/2005 | Broman et al. |
| 2005/0260473 A1 | * | 11/2005 | Wang .............................. 429/33 |
| 2009/0263699 A1 | * | 10/2009 | Sadasue et al. ................. 429/30 |
| 2012/0301787 A1 | * | 11/2012 | Yamamura et al. ........ 429/231.5 |

FOREIGN PATENT DOCUMENTS

| | | |
|---|---|---|
| JP | 6-38340 B2 | 5/1994 |
| JP | 10-172600 A | 6/1998 |
| JP | 10-208767 A | 8/1998 |
| KR | 10-2009-0046087 A | 5/2009 |

OTHER PUBLICATIONS

Machine Translation of Jin et al. (KR 10-2009-0046087, published May 2009, pp. 1-5).*
English Machine Translation of JP 10-172600 A (8 pages).
Patent Abstracts of Japan Pub. No. 63-053860, dated Mar. 8, 1988 for JP Patent No. 6-38340 B2 (1 page).
Dongyang Chen et al., "Sulfonated poly (fluorenyl ether ketone) membrane with embedded silica rich layer and enhanced proton selectivity for vanadium redox flow battery," Journal of Power Sources 195 (2010) pp. 7701-7708.

(Continued)

*Primary Examiner* — Basia Ridley
*Assistant Examiner* — Caitlin Wilmot
(74) *Attorney, Agent, or Firm* — Christie, Parker & Hale, LLP

(57) ABSTRACT

A separator for a redox flow battery and a redox flow battery including the same, and the separator includes a cation conductive film and an anion conductive film disposed on either side of the cation conductive film.

16 Claims, 3 Drawing Sheets

(56) References Cited

OTHER PUBLICATIONS

Joeng-Geun Kim et al., "Application of Psf-PPSS-TPA composite membrane in the all-vanadium redox flow battery," Journal of Industrial and Engineering Chemistry 16 (2010) pp. 756-762.

Machine English Translation of JP 10-208767 A (9 pages).
Zhensheng Mai et al., "Sulfonated poly (tetramethydiphenyl ether ether ketone) membranes for vanadium redox flow battery application," Journal of Power Sources 196 (2011) pp. 482-487.

* cited by examiner

SEPARATOR FOR REDOX FLOW BATTERY AND REDOX FLOW BATTERY

CROSS-REFERENCE TO RELATED APPLICATION

This application claims priority to and the benefit of Korean Patent Application No. 10-2011-0035830, filed in the Korean Intellectual Property Office on Apr. 18, 2011, the entire content of which is incorporated herein by reference.

BACKGROUND

1. Field

This disclosure relates to a separator for a redox flow battery and a redox flow battery including the same.

2. Description of Related Art

A rechargeable battery is utilized to transform electrical energy into chemical energy and to store this chemical energy and then to retransform the chemical energy into electrical energy. Here, a rechargeable battery having a lighter weight has been actively researched.

Recently, a redox flow battery has garnered attention as a high-capacity and high efficiency rechargeable battery, which may be appropriate or suitable for a large system such as an electric power storage system and the like.

Unlike other batteries, the redox flow battery does not use a solid as an active material, but rather uses aqueous ions as the active material and generates energy through an oxidation/reduction reaction of the aqueous ions at the positive and negative electrodes.

SUMMARY

An embodiment of the present invention is directed toward a separator for a redox flow battery that can effectively suppress cross-over of an active material.

Another embodiment of the present invention is directed toward a redox flow battery including the separator.

According to an embodiment of the present invention, provided is a separator for a redox flow battery including a cation conductive film, and an anion conductive film disposed on either side of the cation conductive film.

In one embodiment, the anion conductive film includes an anion conductive polymer having a cation including N. The cation including N may include a pyridinium group, a pyrrolidinium group, an ammonium group, an imidazolium group, or a combination thereof.

The anion conductive polymer may include poly(4-vinyl pyridinium chloride), poly(2-vinyl pyridinium chloride), poly(styrene-b-2-vinylpyridinium chloride), poly(vinyl pyrrolidinium chloride), polydiaryldimethylammonium-chloride, poly(1-methyl-4-vinylpyridinium bromide), poly(methacryloyloxyethyltriethylammonium bromide), poly(diallylammonium chloride), poly(4-vinyl pyridine), poly(2-methyl-5-vinylpyridine), or a combination thereof.

The anion conductive film may have a thickness in a range from 5 nm to 100 nm.

The cation conductive film may include a cation conductive polymer including a sulfonic acid group, a carboxylic acid group, a phosphoric acid group, a phosphonic acid group, or a cation exchange group of a derivative thereof at the side chain.

The cation conductive film may have a thickness in a range from 20 μm to 200 μm.

According to another embodiment of the present invention, provided is a redox flow battery including an electrode assembly including the separator and positive and negative electrodes respectively positioned at both sides of the separator, a positive electrode supplier configured to supply a positive active material liquid to the positive electrode, and a negative electrode supplier configured to supply a negative active material liquid to the negative electrode.

The positive active material may be a +5-valent to +4-valent vanadium-based compound, for example, $(VO_2)_2SO_4$, $VO(SO_4)$, or a combination thereof.

The positive active material liquid may include a mixed solvent of sulfuric acid and water.

The positive active material liquid may have a concentration of the positive active material in a range from 1M to 10M.

The negative active material may include a +2-valent to +3-valent vanadium-based compound, for example, $VSO_4$, $V_2(SO_4)_3$, or a combination thereof.

The negative active material liquid may include a mixed solvent of sulfuric acid and water.

The negative active material liquid may have a concentration of the negative active material in a range from 1M to 10M.

Hereinafter, further embodiments will be described in more detail.

According to one embodiment of the present invention, the separator may effectively suppress cross-over of an active material.

DETAILED DESCRIPTION

Exemplary embodiments of the present disclosure will hereinafter be described in more detail. However, these embodiments are only exemplary, and this disclosure is not limited thereto.

One embodiment of the present invention provides a separator for a redox flow battery. In general, a redox flow battery uses positive and negative active materials in a form of aqueous liquids, and when the positive and the negative active material liquids are supplied to an electrode assembly including positive and negative electrodes and a separator, an oxidation/reduction reaction of ions occurs at the positive and negative electrodes, thereby generating electrical energy.

In other words, a tetravalent vanadium ion (e.g., a +4 oxidation state vanadium ion) is oxidized into a pentavalent vanadium ion (e.g., a +5 oxidation state vanadium ion), losing an electron and passing a proton through a separator from the positive electrode to the negative electrode at the positive electrode during the charge reaction, while a trivalent vanadium ion (e.g., a +3 oxidation state vanadium ion) accepts the electron and is converted into a divalent vanadium ion (e.g., a +2 oxidation state vanadium ion), that is, the reduction reaction occurs, at the negative electrode. On the contrary, an oxidation/reduction reaction, that is, a redox reaction, may occur during the discharge reaction in which the oxidation state (oxidation number) of a vanadium ion is changed.

In other words, a separator should pass a proton, but block a cation of positive and negative active materials from moving toward a counter electrode. However, the separator passes a cation, particularly a vanadium cation, and is self-discharged, resultantly deteriorating columbic efficiency.

Figure 1:
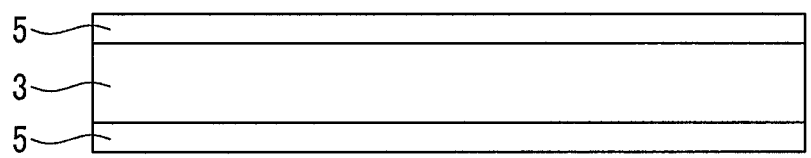
FIG. 1 schematically provides the structure of a separator for a redox flow battery according to an embodiment of the present invention.
Figure 2A:
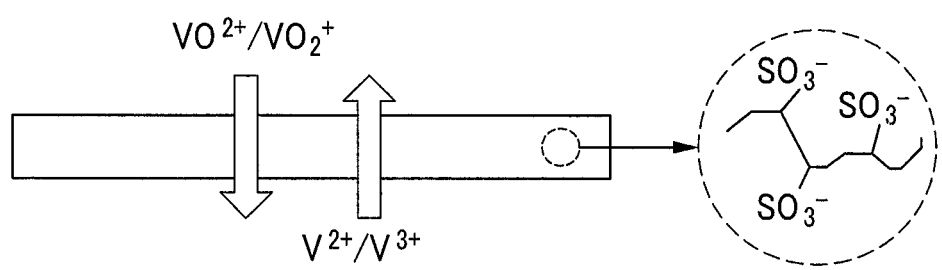
FIG. 2A is a drawing that shows a cross-over phenomenon of an active material in a conventional separator for a redox flow battery.
Figure 2B:
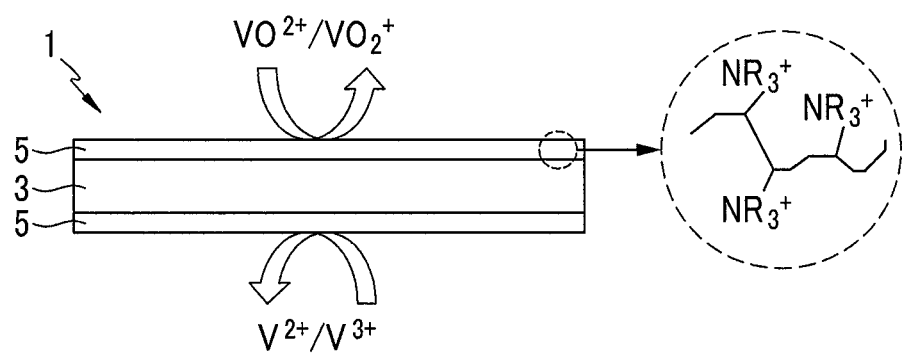
FIG. 2B provides a drawing that shows cross-over suppression of an active material in a separator for a redox flow battery according to an embodiment of the present invention.

According to one embodiment of the present invention, a separator 1, as shown in FIG. 1, may suppress cross-over of a vanadium cation by forming an anion conductive film 5 on both sides of a cation conductive film 3. In other words, as shown in FIG. 2A, a conventional separator may readily pass a cation of an active material, for example a vanadium ion (a positive electrode: $VO^{2+}/VO_2^+$, a negative electrode: $V^{2+}/V^{3+}$), through a cation conductive group (e.g., $SO_3^-$) thereof. On the contrary, as shown in FIG. 2B, a separator according to one embodiment of the present invention has a cation of an anion conductive film, for example ammonium, and the cation generates charge rejection, thereby suppressing cross-over of a cation.

According to one embodiment of the present invention, the anion conductive film includes an anion conductive polymer having a cation including N. The cation may include a pyridinium group, a pyrrolidinium group, an ammonium group, an imidazolium group, or a combination thereof.

Such an anion conductive polymer may include poly(4-vinyl pyridinium chloride), poly(2-vinyl pyridinium chloride), poly(styrene-b-2-vinylpyridinium chloride), poly(vinyl pyrrolidinium chloride), polydiaryldimethylammoniumchloride, poly(1-methyl-4-vinylpyridinium bromide), poly(methacryloyloxyethyltriethylammoniumbromide), poly(diallylammoniumchloride), poly(4-vinyl pyridine), poly(2-methyl-5-vinylpyridine), or a combination thereof.

When a porous polymer layer such as polyethylene and the like, rather than the anion conductive polymer, is formed on both sides of a cation exchange film, the separator may have somewhat improved mechanical strength, but may not suppress cross-over.

In one embodiment, the anion conductive film has a thickness in a range from 5 nm to 100 nm. In one embodiment, when the anion conductive film has a thickness within the range, the separator easily passes protons and thus does not have voltage efficiency deterioration, and therefore effectively suppresses cation movement of an active material.

The cation conductive film may include a cation conductive polymer having a sulfonic acid group, a carboxylic acid group, a phosphoric acid group, a phosphonic acid group, or a cation exchange group of a derivative thereof at the side chain. Examples of the cation conductive polymer may have the cation exchange group at the side chain and include at least one selected from a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer.

In particular, the cation conductive polymer included in the cation conductive film may include at least one selected from poly(perfluorosulfonic acid) (commercially available NAFION), poly(perfluorocarboxylic acid), a copolymer of tetrafluoroethylene and fluorovinylether including a sulfonic acid group, polyetherketone sulfide, aryl ketone having the cation exchange group at the side chain, poly[(2,2'-m-phenylene)-5,5'-bibenzimidazole][poly(2,2'-(m-phenylene)-5,5'-bibenzimidazole] having the cation exchange group at the side chain, or poly(2,5-benzimidazole) having the cation exchange group at the side chain. In addition, the cation conductive polymer may include a porous polymer such as porous polyethylene, porous polypropylene, porous polyvinylchloride, and the like, and the porous polymer has the cation exchange group at the side chain.

In one embodiment, the cation conductive film has a thickness in a range from 20 μm to 200 μm. In one embodiment, when a cation conductive film has a thickness within the range, the separator has high energy efficiency. In another embodiment, when a cation conductive film has a thickness of less than 20 μm, the separator has decreased resistance against protons transference and thus has increased voltage efficiency. However, the separator may have more pin-holes on the conductive film due to the pressure generated when an active material liquid is injected into positive and negative electrodes, and thus has higher cross-over, thereby deteriorating columbic efficiency. In addition and in one embodiment, when a cation conductive film has a thickness of more than 200 μm, the cation conductive film has a higher mechanical strength and less possibility of generating a pin-hole, and also lower cross-over of an active material and thus higher columbic efficiency. However, the cation conductive film may have increased resistance against protons transference, thereby decreasing voltage efficiency.

According to one embodiment of the present invention, a separator is fabricated by adding an anion conductive polymer to a solvent to prepare an anion conductive polymer liquid and coating the anion conductive polymer liquid on both sides of a cation conductive film. The solvent may include methanol, ethanol, isopropyl alcohol, acetone, N-methylpyrrolidone, n-propylalcohol, tetrahydrofuran, water, or a combination thereof. The coating may include spray coating, dip coating, doctor blade coating, comma bar coating, slot die coating, and the like. In one embodiment, the anion conductive polymer in the anion conductive polymer liquid has a concentration in a range from 3 wt % to 20 wt %. In one embodiment, when the anion conductive polymer in the anion conductive polymer liquid has a concentration within the range, the coating is uniformly formed, thereby forming an anion conductive polymer layer with an appropriate thickness without increasing resistance.

According to another embodiment of the present invention, provided is a redox flow battery including an electrode assembly including the separator and positive and negative electrodes respectively at (on) both sides of the separator, a positive electrode supplier configured to supply a positive active material liquid to the positive electrode, and a negative electrode supplier configured to supply a negative active material liquid to the negative electrode.

The positive active material may be a +5-valent (pentavalent) to +4-valent (tetravalent) vanadium-based compound (e.g., a +5 oxidation state to +4 oxidation state vanadium-based compound), for example, $(VO_2)_2SO_4$, $VO(SO_4)$, or a combination thereof.

The positive active material liquid may include a mixture of sulfuric acid and water, that is, a sulfuric acid aqueous solution, as a solvent. In one embodiment, the mixture of sulfuric acid and water, that is, a sulfuric acid aqueous solution, includes a sulfuric acid with a concentration in a range from 1M to 5M. In one embodiment, when the sulfuric acid aqueous solution has a concentration within the range, it has appropriate solubility against the active material, and thus has appropriate ion conductivity and increases viscosity of the active material liquid and resultantly may not bring about an overvoltage problem.

In one embodiment, the positive active material liquid has a concentration in a range from 1M to 10M (of the positive active material in the liquid). In one embodiment, when the positive active material liquid has a concentration within the range, it can bring about high energy density and high power density. In one embodiment, when the positive active material liquid has a concentration of less than 1M, the active material included in the liquid is too little of an amount per unit volume, thereby decreasing energy density. On the contrary and in another embodiment, when the positive active material liquid has a concentration of more than 10M, the active material liquid has sharply increased viscosity and thus a remarkably decreased oxidation/reduction reaction speed, thereby decreasing power density.

The negative active material may be a +2-valent (divalent) to +3-valent (tetravalent) vanadium-based compound (e.g., a +2 oxidation state to +3 oxidation state vanadium-based compound), for example, $VSO_4$, $V_2(SO_4)_3$, or a combination thereof.

The negative active material liquid may include a mixture of sulfuric acid and water, that is, a sulfuric acid aqueous solution, as a solvent like the positive active material liquid.

In one embodiment, the negative active material liquid has a concentration in a range from 1M to 10M. In one embodiment, when the negative active material liquid has a concentration within the range, it brings about high energy density and high power density. In one embodiment, when the negative active material liquid has a concentration of less than 1M, the active material in the liquid is of too less of an amount per unit volume, thereby decreasing energy density. On the other hand and in another embodiment, when the negative active material liquid has a concentration of more than 10M, the active material liquid has sharply increased viscosity and thus a sharply decreased oxidation/reduction reaction speed, thereby decreasing power density.

The positive and negative electrodes may be made of a conductive substrate. In addition, the electrodes may further include a polar plate on one side of the conductive substrate, that is, on the side facing oppositely away from a separator.

The conductive substrate may include carbon paper, carbon cloth, carbon felt, or metal cloth (a porous film made of fiber-type metal or a metal film formed on the surface of a polymer fiber cloth), but is not limited thereto. Furthermore, the conductive substrate may be porous.

In addition, the polar plate may be made of graphite. The polar plate may have a channel.

Figure 3:
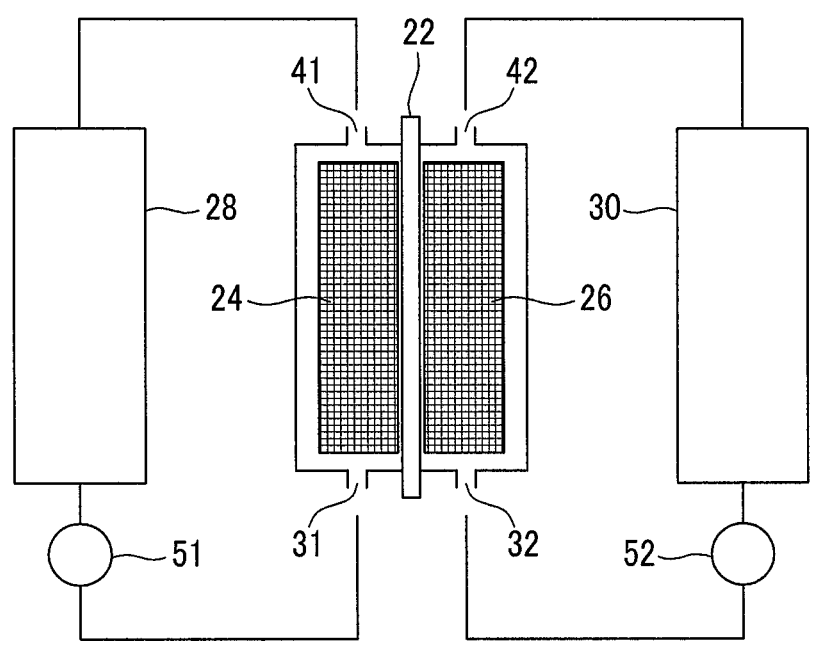
FIG. 3 provides a drawing that schematically shows the structure of a redox flow battery according to another embodiment of the present invention.

FIG. 3 schematically shows the structure of the redox flow battery. As shown in FIG. 3, a redox flow battery 20 includes an electrode assembly including a separator 22 and a positive electrode 24 and a negative electrode 26 respectively at (on) both sides of the separator 22, a positive electrode tank 28 configured to supply a positive active material to the positive electrode 24, and a negative electrode tank 30 configured to supply a negative active material to the negative electrode 25. The positive active material stored in the positive electrode tank 28 is delivered to the positive electrode 24 through a pump 51 and a positive active material inlet 31, and is then sent back to the positive electrode tank 28 through a positive active material outlet 41 when a redox reaction is completed. The negative active material stored in the negative electrode tank 30 is delivered to the negative electrode 26 through a pump 52 and a negative active material inlet 32, and is then sent back to the positive electrode tank 30 through a positive active material outlet 42 when a redox reaction is completed.

The following examples illustrate this disclosure in more detail. These examples, however, should not be interpreted as limiting the scope of this disclosure.

Example 1

A poly(styrene-b-2-vinylpyridinium chloride) anion conductive polymer is added to an n-propanol/tetrahydrofuran mixed solvent in a volume ratio of 1/1 to prepare an anion conductive liquid with a concentration of 5 wt % of the anion conductive polymer in the anion conductive liquid.

The anion conductive polymer liquid is spray-coated to be 5 nm thick on both sides of a 180 μm-thick NAFION 117 cation conductive film, thereby fabricating a separator having a 5 nm-thick anion conductive film at (on) both sides of the cation conductive film.

Next, a carbon felt positive electrode and a negative electrode are respectively positioned at (on) both sides of the separator, and graphite polar plates are respectively positioned at (on) one side of the positive electrode facing oppositely away from the separator and at (on) one side of the negative electrode facing oppositely away from the separator. The separator is clamped with the positive and negative electrodes and the graphite polar plates, thereby fabricating an electrode assembly. Herein, the electrode area is 6 cm$^2$.

On the other hand, 1.5M $VO(SO_4)$ is dissolved in a 3M sulfuric acid aqueous solution, thereby preparing a positive active material solution. In addition, 1.5M $V_2(SO_4)_3$ is dissolved in a 3M sulfuric acid aqueous solution, thereby preparing a negative active material solution.

The electrode assembly and the positive and negative active material solutions are used to fabricate a redox flow battery cell with a structure provided in FIG. 3.

Example 2

A redox flow battery cell is fabricated according to the same method as Example 1 except for using a separator fabricated by coating the anion conductive polymer liquid according to Example 1 to be 10 nm thick on both sides of a 180 μm-thick NAFION 117 cation conductive film to form a 10 nm-thick anion conductive film on both sides thereof.

Example 3

A redox flow battery cell is fabricated according to the same method as Example 1 except for using a separator fabricated by coating the anion conductive polymer liquid according to Example 1 to be 100 nm thick on both sides of a 180 μm-thick NAFION 117 cation conductive film to form a 100 nm-thick anion conductive film on both sides thereof.

Comparative Example 1

A redox flow battery cell is fabricated according to the same method as Example 1 except for using a 180 μm-thick NAFION 117 cation conductive film as a separator.

Comparative Example 2

A redox flow battery cell is fabricated according to the same method as Example 1 except for using a separator fabricated by coating the anion conductive polymer liquid to be 500 nm thick on both sides of a 180 μm-thick NAFION 117 cation conductive film to form a 500 nm-thick anion conductive film on both sides thereof.

Comparative Example 3

A redox flow battery cell is fabricated according to the same method as Example 1 except for using a separator fabricated by coating the anion conductive polymer liquid to be 1000 nm thick on both sides of a 180 μm-thick NAFION 117 cation conductive film to form a 1000 nm-thick anion conductive film on both sides thereof.

The redox flow battery cells according to Examples 1 to 3 and Comparative Examples 1 to 3 are measured regarding voltage efficiency, columbic efficiency, and energy efficiency by injecting the positive and negative active material solutions respectively in an amount of 30 ml into the electrode assembly and charging and discharging the battery cells with a current density of 50 mA/cm$^2$.

Herein, the voltage efficiency is calculated according to the following Equation 1.

Voltage efficiency(%)=(an average voltage during the discharge/an average voltage during the charge)×100

Columbic efficiency(%)=(discharge capacity/charge capacity)×100

Energy efficiency(%)=(voltage efficiency/100×coulombic efficiency/100)×100      Equation 1

In addition, impedance is measured to calculate film resistance. These experiments are all performed at room temperature. The results are provided in the following Table 1.

TABLE 1

| | Anion conductive film thickness (nm) | Film resistance (Ω cm$^2$) | Columbic efficiency (%) | Voltage efficiency (%) | Energy efficiency (%) |
|---|---|---|---|---|---|
| Comparative Example 1 | 0 | 1.20 | 91.2 | 92.3 | 84.2 |
| Example 1 | 5 | 1.32 | 94.3 | 91.7 | 86.4 |
| Example 2 | 10 | 1.46 | 96.7 | 91.1 | 85.9 |
| Example 3 | 100 | 2.02 | 98.8 | 84.6 | 83.6 |
| Comparative Example 2 | 500 | 6.27 | 99.2 | 74.9 | 74.3 |
| Comparative Example 3 | 1000 | 13.9 | 99.5 | 68.5 | 68.2 |

As shown in Table 1, the redox flow battery cells, each including a separator having a 5 nm to 100 nm-thick anion conductive film according to each of Examples 1 to 3, have better columbic efficiency and energy efficiency than the one including no anion conductive film according to Comparative Example 1. In addition, the redox flow battery cells, each including a separator having more than 100 nm anion conductive film according to each of Comparative Examples 2 and 3, have improved columbic efficiency, but deteriorated voltage efficiency and energy efficiency, and also have increased film resistance compared with the ones according to Examples 1 to 3.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned exemplary embodiments should be understood to be exemplary in every way, but not limited thereto.

What is claimed is:

1. A separator for a redox flow battery, comprising:
a cation conductive film; and
an anion conductive film having a thickness of 5 nm to 100 nm on both sides of the cation conductive film.

2. The separator of claim 1, wherein the anion conductive film comprises an anion conductive polymer having a cation comprising N.

3. The separator of claim 2, wherein the cation of the anion conductive polymer further comprises a pyridinium group, a pyrrolidinium group, an ammonium group, an imidazolium group, or a combination thereof.

4. The separator of claim 1, wherein the anion conductive film comprises an anion conductive polymer, and a cation of the anion conductive polymer comprises a pyridinium group, a pyrrolidinium group, an ammonium group, an imidazolium group, or a combination thereof.

5. The separator of claim 1, wherein the anion conductive film comprises an anion conductive polymer of poly(4-vinyl pyridinium chloride), poly(2-vinyl pyridinium chloride), poly(styrene-b-2-vinylpyridinium chloride), poly(vinyl pyrrolidinium chloride), polydiaryldimethylammoniumchloride, poly(1-methyl-4-vinylpyridinium bromide), poly(methacryloyloxyethyltriethylammoniumbromide), poly(diallylammoniumchloride), poly(diallylammoniumchloride), poly(4-vinyl pyridine), poly(2-methyl-5-vinylpyridine), or a combination thereof.

6. The separator of claim 1, wherein the cation conductive film comprises a cation conductive polymer having a sulfonic acid group, a carboxylic acid group, a phosphoric acid group, a phosphonic acid group, or a cation exchange group of a derivative thereof at the side chain.

7. The separator of claim 1, wherein the cation conductive film has a thickness in a range from 20 µm to 200 µm.

8. A redox flow battery comprising;
an electrode assembly comprising a separator and positive and negative electrodes respectively positioned at both sides of the separator, the separator comprising a cation conductive film, and an anion conductive film having a thickness of 5 nm to 100 nm on both sides of the cation conductive film;
a positive electrode supplier configured to supply a positive active material liquid to the positive electrode; and
a negative electrode supplier configured to supply a negative active material liquid to the negative electrode.

9. The redox flow battery of claim 8, wherein the positive active material is +5-valent to +4-valent vanadium-based compound.

10. The redox flow battery of claim 8, wherein the positive active material is $(VO_2)_2SO_4$, $VO(SO_4)$, or a combination thereof.

11. The redox flow battery of claim 8, wherein the positive active material liquid comprises a mixed solvent of sulfuric acid and water.

12. The redox flow battery of claim 8, wherein the positive active material liquid has a concentration of the positive active material in a range from 1M to 10M.

13. The redox flow battery of claim 8, wherein the negative active material is a +2-valent to +3-valent vanadium-based compound.

14. The redox flow battery of claim 8, wherein the negative active material is $VSO_4$, $V_2(SO_4)_3$, or a combination thereof.

15. The redox flow battery of claim 8, wherein the negative active material liquid comprises a mixed solvent of sulfuric acid and water.

16. The redox flow battery of claim 8, wherein the negative active material liquid has a concentration of the negative active material in a range from 1M to 10M.

\* \* \* \* \*